Sept. 22, 1959 M. G. HOLLABAUGH 2,905,521

DIGITAL RECORDING SYSTEM

Filed June 21, 1955 6 Sheets-Sheet 1

INVENTOR.
MAX G. HOLLABAUGH

BY

Ostrolenk, Faber, Gerb & Soffen
ATTORNEYS

Sept. 22, 1959 M. G. HOLLABAUGH 2,905,521

DIGITAL RECORDING SYSTEM

Filed June 21, 1955 6 Sheets-Sheet 2

INVENTOR.
MAX G. HOLLABAUGH

BY

Ostrolenk, Faber, Gerb & Soffen
ATTORNEYS

INVENTOR.
MAX G. HOLLABAUGH

BY

Ostrolenk, Faber, Gerb & Soffen
ATTORNEYS

INVENTOR.
MAX G. HOLLABAUGH

BY

Ostrolenk, Faber, Gerb & Soffen,
ATTORNEYS

DIGITAL RECORDING SYSTEM

Filed June 21, 1955 6 Sheets-Sheet 5

INVENTOR.
MAX G. HOLLABAUGH
BY
Ostrolenk, Faber, Gerb & Soffen
ATTORNEYS

Sept. 22, 1959 M. G. HOLLABAUGH 2,905,521

DIGITAL RECORDING SYSTEM

Filed June 21, 1955 6 Sheets-Sheet 6

INVENTOR.
MAX G. HOLLABAUGH

BY

Ostrolenk, Faber, Gerb & Soffen
ATTORNEYS

United States Patent Office 2,905,521

Patented Sept. 22, 1959

2,905,521

DIGITAL RECORDING SYSTEM

Max G. Hollabaugh, Jackson Heights, N.Y., assignor to Standard Coil Products Co., Inc., Los Angeles, Calif., a corporation of Illinois Application June 21, 1955, Serial No. 516,982

6 Claims. (Cl. 346—74)

This invention relates to digital recording systems, particularly one incorporating a magnetic drum. More particularly, it relates to novel magnetic recording systems usable for storage, recording and memory applications.

In accordance with the present invention, a drum type magnetic structure is provided, usable in digital computing systems, high speed business machines, the recording of transient phenomena, and for many other applications. It is particularly directed for stability over wide temperature changes, vibration and shock conditions, humidity changes and even under conditions of dusty atmosphere. The recording system of the invention lends itself to a compact lightweight structure for high speed, wide-band operation, and is usable in high speed aircraft, battleships, tanks, and trucks as well as stationary ground positions.

The magnetic drum of a preferred form of the invention system is spindle mounted in a vertical plane, and provided with suitable shock absorbing structures to be substantially impervious to vibrations as might occur abroad an aircraft or battleship or vehicle in which it is installed. Further features of the invention are directed to the prevention of dust and dirt from entering into the magnetic components of the system that would upset magnetic transcriptions thereon. The use of a central quill assembly about the drive shaft or spindle for the recording drum, together with sealing collars enclosing the bearings and the end portions of shafts, provide a practical drive for the recording drum with a minimum of exposure to the external atmosphere. Proper regard to the selection of materials, their precision fabrication and arrangement afford fundamental stability under wide temperature variations of the components in operation.

By affording negligible vibration or relative displacement of the recording drum with respect to the precisely located and fixed recording heads, uniform reading and writing of magnetic messages on the recording drum is accomplished in the plurality of channels utilized thereon, affording stable operation required in high speed complex computing utilization of the invention. Features of the present invention are directed to operation over long periods of time at uniform performance characteristics and over wide ambient temperature changes without deleterious effects in performance.

Accordingly, an object of the present invention is to provide a novel, magnetic drum unit that is stable under wide variations in temperature and vibration conditions.

A further object of the present invention is to provide a novel magnetic drum system substantially impervious to vibration, acceleration forces and impact conditions.

Another feature of the present invention is to provide a novel magnetic drum system substantially impervious to external conditions of dust and dirt in the atmosphere that could interfere with the magnetic operation thereof.

A further object of the present invention is to provide novel mechanical features adjustably mounting recording heads in a magnetic system in precise predetermined and rigid relationships with respect to multiple channels across the recording medium.

The above and further objects of the present invention become more apparent in the following description of exemplary embodiments thereof illustrated in the accompanying drawings in which.

*Magnetic drum system*

Figure 1:
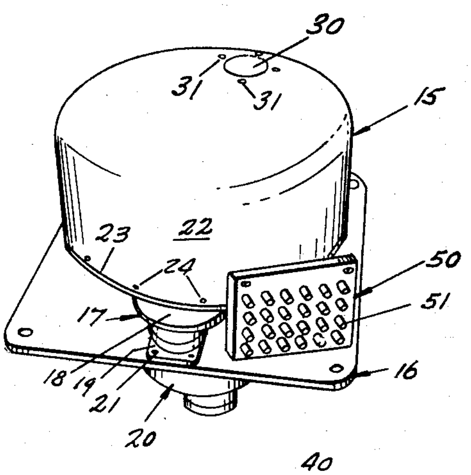
Figure 1 is a perspective view of the magnetic drum recording system completely assembled.
Figure 2:
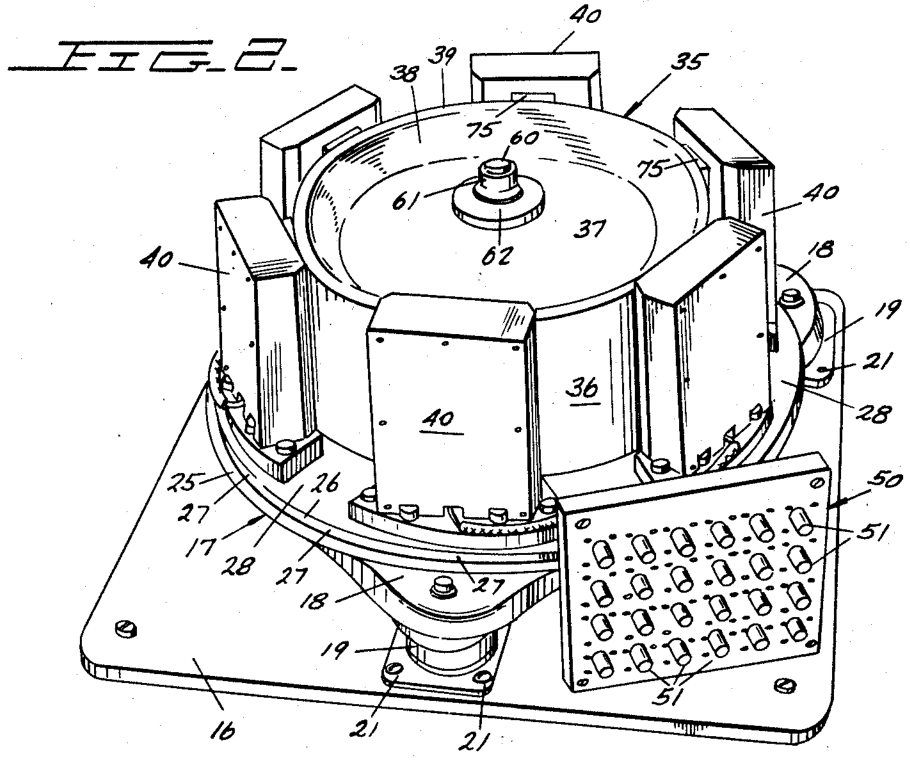
Figure 2 is a perspective showing of an exemplary embodiment of the magnetic drum system, with the top dust cover removed.

Referring now to Figures 1 and 2, the exemplary embodiment of the digital recording drum assembly is seen in perspective with its dust covers on in Figure 1; and in Figure 2, with the top dust cover removed. The magnetic recording assembly 15 is mounted upon and extends above mounting base 16. The motor drive assembly 20 is mounted upon and extends below the same mounting base 16 as seen in Figure 1. The magnetic drum assembly, per se, is supported upon a base 17 as will be detailed hereinafter. Base 17 has three extending arms 18; each arm 18 of base 17 is connected to a shock-mount unit 19. Each shock-mount unit 19 is secured to mounting base 16 by suitable screws 21. Base 17 supporting the magnetic assembly has a circular rim 25 with a contiguous annular flange or step portion 26 recessed inwards.

Figure 3:
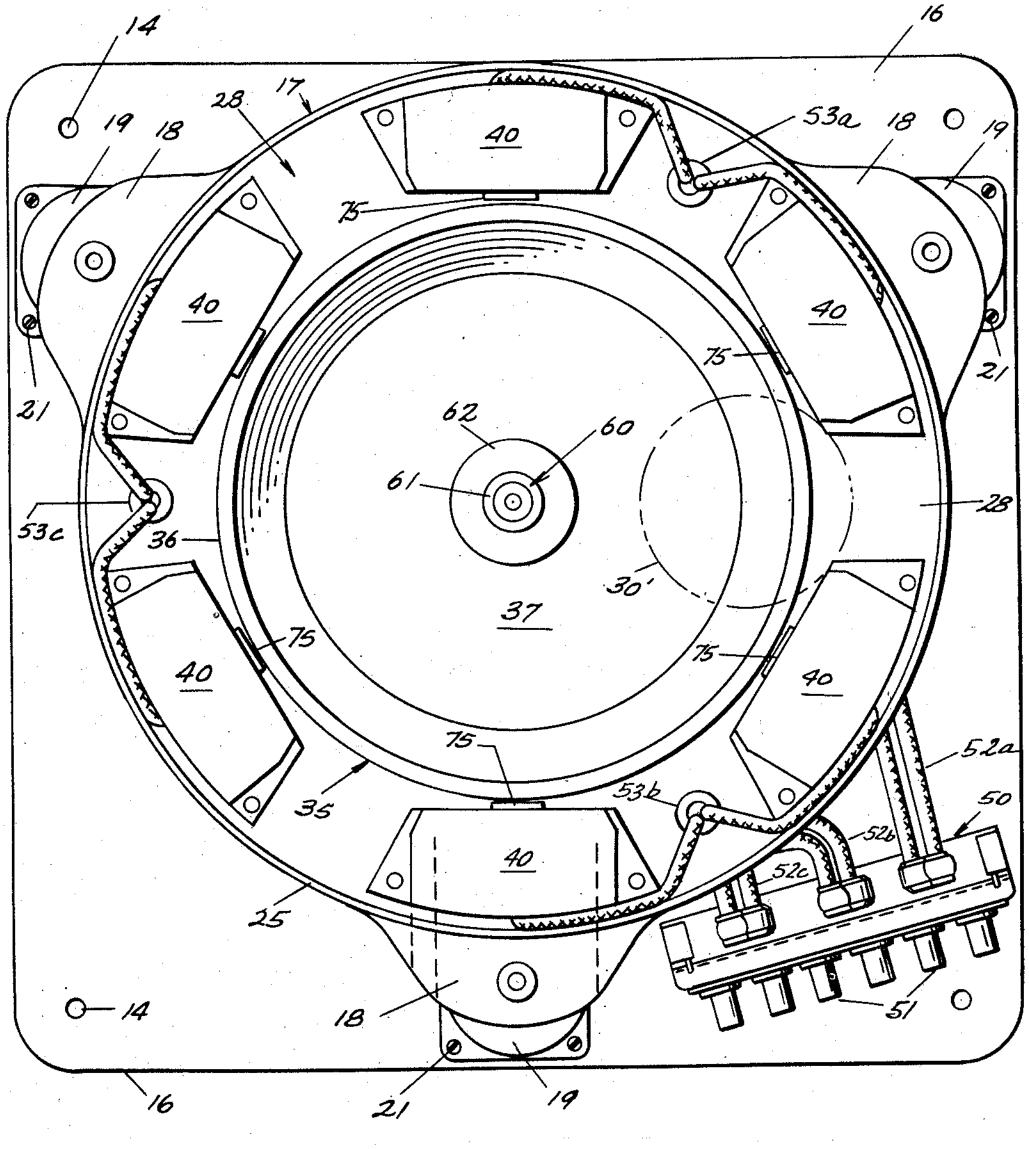
Figure 3 is a plan view of the magnetic drum system corresponding to Figure 2.

The dust cover 22 subtends the magnetic drum and associated units 15 on base 17. In the illustrated embodiment the dust cover 22 is cylindrical, with an open end defining its peripheral edge 23. The peripheral portion 23 of dust cover 22 is seated in the channeled circular edge of base 17, constituting rim 25 and annular step 26 perpendicular thereto. Tapped holes 27, 27 in annular surface 26 accommodate screws 24, 24 which secure the dust shield or cover 22 to the base 17 as will now be understood. Should gasketing be desired, it may be used in this region where the dust cover 22 is joined to base 17. A transparent window 30 preferably of Lucite material is secured in an opening in the top face of cover 22, such as by screws 31, 31. The relative location of the window 30 is indicated in Figure 3 by the dotted circular line 35, whereby functioning and rotation of the magnetic drum 35 within cover 22 may be observed.

Figure 2 shows in perspective an exemplary embodiment of the digital recording drum 35, coacting with twenty-four individual read-write or recording heads to be further described hereinafter. A series of vertical stanchions 40 extend from the internal top horizontal circular surface 28 of base 17. As will be shown hereinafter, each exemplary stanchion 40 contains four individual recording heads held in operative coaction with the recording surface 36 of the magnetic drum 35. Each recording head is connected to the terminal block 50 at an individual terminal post 51. In the illustrated embodiment there are twenty-four terminal posts 51 individually mounted in an insulating block comprising terminal board 50. Terminal board 50 is shown in more detail in Figures 13 and 14.

The magnetic recording drum 35 has a cylindrical magnetizable surface 36 at its circumferential portion. The hub 37 of drum 35 extends to the central drive shaft 60, actually through the recording drum 35, and projecting vertically through the top of the drum 36 in a manner to be detailed hereinafter. A sealing nut 61 secures the assembly of drum 35 to the top end of shaft 60. A suitable washer 62 is between nut 61 and the top surface 37 of drum 35. The magnetic drum 35 is designed to have a stable rotational inertia consistent with strength of the drum as a whole, and particularly reinforced at the recording surface 36. Towards this end, drum 35 has a cavity defined by the conical annular surface 38 and a flat rim 39 at the horizontal portion of drum 35.

It is important, as referred to above, to maintain a rigid predetermined relationship between the magnetic surface 36 of the recording drum 35 and each of the recording heads despite vibrations, shocks or accelerations of the vehicle in which the magnetic unit 15 is mounted and despite vibrations of the motor drive 20, or of other factors that might be changed due to temperature and humidity and dust in the surroundings. The present invention is directed to minimize to a point of practical immunity any imperfections and variations in the recording and/or reproduction of magnetic signals of the recording heads with the drum surface 36, and also to eliminate any deleterious magnetic effects that would occur should dust or other particles be swept into the unit due to its high speed of rotation.

Figure 3 is a top or plan view of the recorder assembly 15 corresponding to the embodiment illustrated in Figure 2. The magnetic drum 35 is clearly shown central of the unit 15 with drive shaft 60 at its center. The recording head stanchions 40 are supported in an annular ring about the drum 35 as radial segments coacting with the surface of the drum 35. The pole tips 75, extending from the recording heads mounted within stanchions 40, coact with the magnetic surface 36 of the drum 35. The surface 36 contains magnetizable material in a thin, even layer as will be set forth hereinafter and coacts in defined channels circumferentially about the surface 36 individually with each of the twenty-four recording heads of the embodiment, across their respective pole faces 75, as will be further set forth.

In the exemplary embodiment, each pole face 75 is close to the magnetizable surface 36 of the drum 35 but is preferably not in contiguous contact therewith. The magnetic flux reactions between the pole faces 75 and the drum surface 36 are of sufficient strength so as not to require actual physical contact of the twenty-four pole faces with the recording surface 36. In this manner, slight vibrations or displacements of the recording drum 35 with respect to the rigidly fixed recording heads and stanchions 40 will not affect the operation of the system. Also, high speed operation of the system, with drum 35 in rotation is more readily accomplished. The present invention provides practical elimination of extraneous vibrations and other deleterious effects on the recording and play-back stability between the pole faces 75 and the drum surface 36, as will become more apparent hereinafter. Furthermore, an indefinite life of the recording surface at 36, as well as of the pole faces 75, is afforded by avoidance of physical contact therebetween in the operation of the system herein.

Each stanchion in the exemplary embodiment contains four recording heads. Each recording head has a shielded cable connected thereto, joining with the composite cabling 52 extending from each stanchion 40. Each stanchion cable 52 contains four cables individual to each of the heads in stanchion 40. There are three openings with corresponding grommets 53, 53 in base 17 through the top horizontal surface 28 thereof. Adjacent stanchions, in three pairs, have two cables extending therefrom through each grommet 53 to the underside of the magnetic drum base 17. These cables 52, 52 are directed in three pairs to the terminal block 50. Each of the exemplary twenty-four individual cables from the six stanchion cables 52 terminate in one of the terminal posts 51 on block 50, as will now be understood. It is to be further understood that more than twenty-four heads, or less, may be used with the drum 35 as compared with illustrated embodiments herein. Twenty-four has been used for the practical installation illustrated in the drawings.

Figure 5:
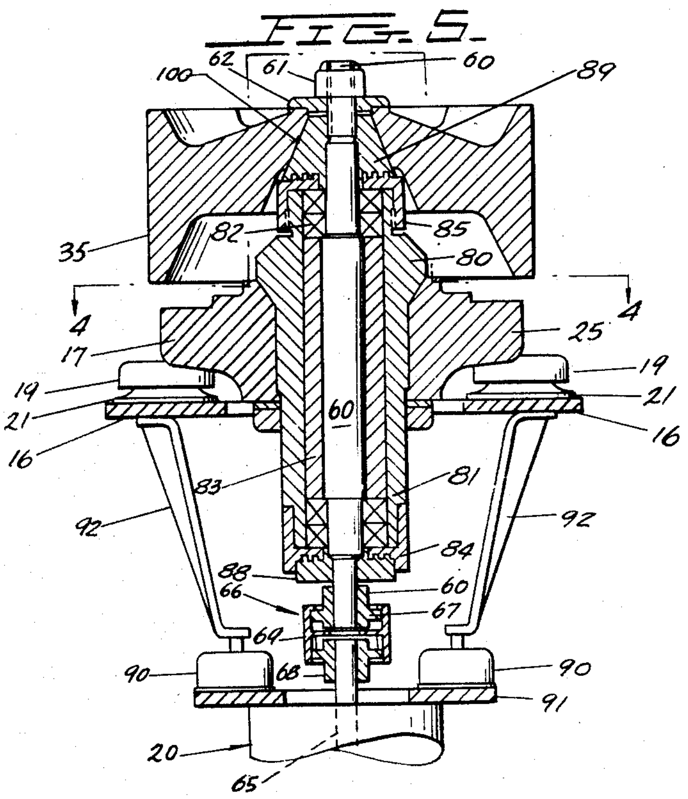
Figure 5 is a cross-sectional view of the magnetic drum system, corresponding to the line 5—5 of Figure 4.
Figure 4:
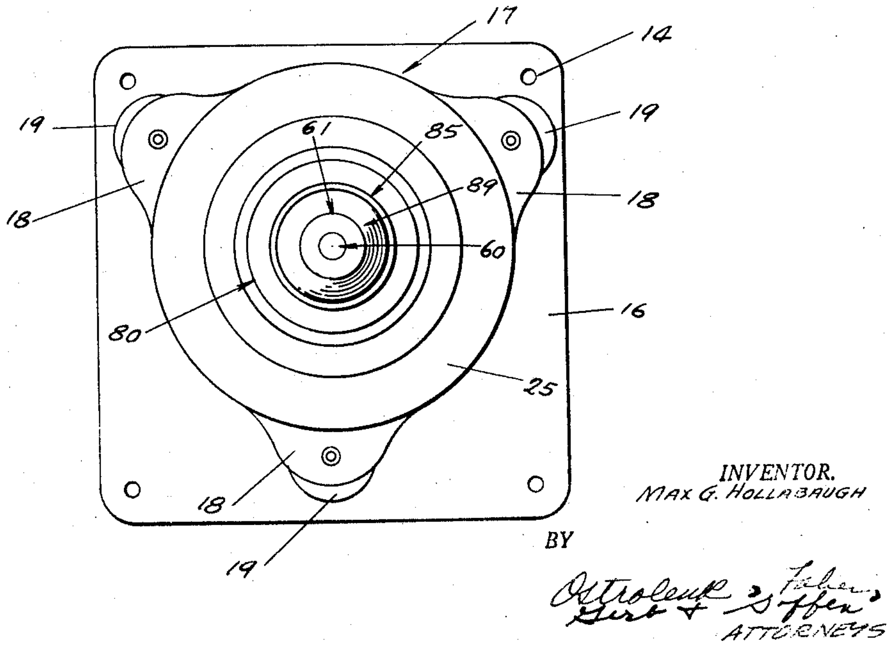
Figure 4 is a plan view of the magnetic drum system of Figure 3, with the magnetic drum removed.

Figure 4 corresponds to the plan view of Figure 3, showing the assembly for the magnetic unit 15, with the drum 35 and stanchions 40 removed. It is the plan view wherein the central collars and quill assembly may be seen for drum 35 and the base 17 for the assembly is shown. Figure 5, corresponding to a cross-sectional view through the unit, shows the details of the quill assembly and associated sealing collars for the purposes now to be described, taken in connection with Figure 4. Stanchions 40 were removed from Figures 4 and 5 merely for clarification of illustration. The base 16 for the magnetic drum assembly is used for mounting the assembly 15 and associated motor drive 20 in the vehicle or stationary location. The mounting holes 14 are used to secure the base 16 to a rigid surface.

In the exemplary embodiments, the vehicle or surface to which the base 16 is secured will not affect the operation of the drum 35 when subjected to acceleration or vibration. For this purpose, shock mounts 19 are provided between the base 16 and the drum assembly base 17 as already set forth. The recording head stanchions 40 and the recording drum 35 are supported with respect to base 17 above the mounting base 16; with the quill assembly to be described also supported in the unit base 17. Base 17 is a casting, machined to proper dimensions to support the quill 80 centrally thereof. The drive shaft 60 for the drum 35 is rotatably supported centrally of quill 80 through roller bearings 81 and 82 at either end thereof. A cylindrical spacer 83 extends between the inner bore of quill 80 and the outer surface of shaft 60. The lower end of shaft 60 is coupled to the end of shaft 65 projecting from the motor drive 20 (not shown in Figure 5).

A flexible coupling unit 66 joins shafts 60 and 65 in driving relationship. The coupling 60 may be any suitable one known in the mechanical arts and in the embodiment herein contains splined collars 67, 68, respectively, secured to shafts 60 and 65. Collars 67, 68 coact with the cylindrical outer shell 69 of the coupling 66 in the usual manner. Thus, a direct drive relationship exists between the motor shaft 65 and the recorder drum shaft 60. Thus, slight vibrations or misalignments or other angular irregularities between the axial relationship of shaft 65 with that of shaft 60 does not affect the dynamically balanced magnetic drum assembly 35 and its associated quill assembly 80. Further vibration isolation to the magnetic drum assembly is provided through the shock mount assembly comprising shock mounts 90, 90 secured between the motor drive assembly base 91 and the unit mounting base 16 through associated brackets 92, 92. It is to be understood that a plurality of assemblies 90, 92 constituting the shock mounts and brackets between main base 16 and motor base 91, such as two, three or four, are satisfactory for the support of the motor drive 20 to base 16 for the drive relationship with drum shaft 60 through coupling 66.

There is thus provided a vertical drive for the drum 35, which drive is free with respect to inherent vibrations or misalignments in respect to the transmittal of rotative power to the drum 35. The further isolation of the drum assembly base 17 from the main base 16, through the shock mounts 19, isolates vibrations of the vehicle or room in which the recording unit 15 is placed, with respect to the drum 35 and the associated stanchions containing recording heads. Impacts and accelerations produced on the assembly 15 in an aircraft, under high speed and maneuvering, have been found to have negligible effect in the operation of the digital recording drum unit as herein set forth. The vibration isolation of the magnetic assembly 35—75, both as to its drive and as to ambient structures, affords such desirable results.

Another important feature of the present invention is the provision of a magnetic drive arrangement that is substantially free of external particles of dust, sand, etc. which may otherwise find their way into the magnetic coacting assembly of the drum 35 and the recording heads 75. Other than the usual precautions of dust covers such as cover 22 and the associated cover of the motor drive 20 (Figure 1), the present invention particularly affords a sealed drive between motor assembly 20 and its projecting shaft 65 on up through to the coupling of drive shaft 60 with the magnetic drum 35. For descriptive purposes herein, we shall refer to the physical embodiment for this feature as the "quill assembly."

The quill assembly comprises the main housing or central structure 80 termed the quill which is firmly seated in the central bore of base 17 of the magnetic unit 15. Quill 80 supports the roller bearings 81, 82 at either end for the drive shaft 60 and supports the shaft centrally along cylindrical spacer 83 within quill 80. A series of highly machined sealing collars of hard material are provided about the ends of quill 80, together with associated collars to afford the sealing, and the drive directly to the drum 35. A collar seal 84 and 85 is secured to each end of the quill 80 and serves to contain or otherwise seal-in the roller bearings 81 and 82. An enlarged view of end seal 84 is shown in Figures 15 and 16 as typical of what is used for both seal 84, as well as for the corresponding seal at 85.

The collar 84 is preferably made of a hard steel material such as one having a Rockwell hardness of the order of 30C. The collar seals 84 and 85 are carefully machined to dimensions of the order of a thousandth of an inch to coact with their mating seal collar, to be described, with negligible off-tolerance therebetween. Good coacting surface tolerances serve as bearing surfaces and seals between the rotating collars and the stationary ones.

Figure 15:
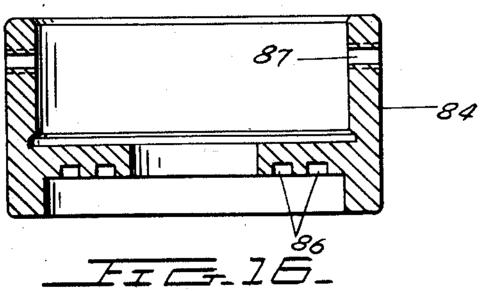
Figures 15 and 16 show in greater detail the end seal shown in the system of Figure 5.
Figure 16:
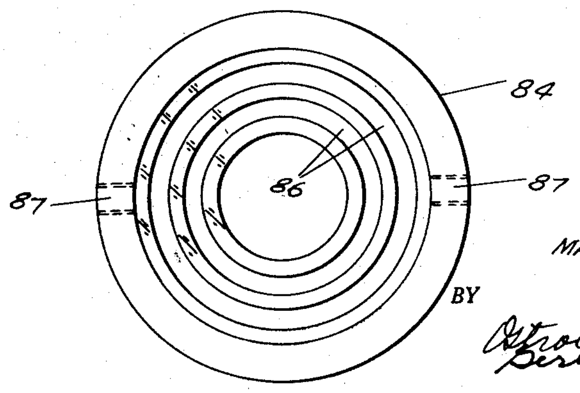

Figure 15 illustrates in an enlarged manner a cross-sectional view of collar seal 84. The top opening, centrally of collar 84, is fitted onto the recessed projection at the bottom end of quill 80 and secured thereto by tap screws or pins in a suitable manner through the openings 87, 87. The opposite or bottom end of collar seal 84 contains concentric grooves 86, 86 at the exposed end thereof. The grooves 86 are for coaction with corresponding annular ridges in the coacting collar seal 88 adjacent thereto. Collar 88 is secured to the bottom end of shaft 60 and is mated with the outer end of collar seal 84, as shown in Figure 5. The ridges of collar 88 coact with the grooves 86 in collar 84 to form a dust-seal bearing. Suitable lubrication between the highly machined coacting surfaces between collars 84 and 88 affords a proper seal and permits efficient drive of the shaft 60 with its secured collar 88 with respect to the stationary collar 84 secured to the stationary quill 80.

The corresponding opposite collar seal 85 is secured to quill 80 and coacts with the tapered collar 89 placed on top thereof. Collar 89 is also made of machinable hard steel, like the other collars, and has annular grooves coacting with corresponding annular ridges of seal 85. Collar seal 85, being stationary with quill 80, permits the tapered collar 89 to rotate thereon through proper close tolerance mating therewith and suitable oil or grease at the boundary of layers. The inner surface or bore of the recording drum 35 has a tapered surface 100 coacting with the equally conically tapered surface of collar 89. A close press fit is afforded by the conical tapered collar 89 secured firmly to the top end of the drive shaft 60, with the inner conically tapered surface of the drum 85.

The washer 62 presses the drum 35 together with the conically tapered collar 89 to secure a driving relationship therebetween. A nut 61, such as an Esna nut known in the art, is used. Nut 61 is threaded internally with a composition surface and is threaded upon the exposed end of shaft 60. The tough pliable interior surface of nut 61 causes it to lock and firmly grip the shaft 60 in a practicably permanent relationship, independent of vibration. Thus, the drum 35 is mounted firmly on the taper collar 89, in turn secured to drive shaft 60. Rotary speeds of 3600 r.p.m. is an exemplary one; with 7200 r.p.m. and higher speeds being feasible with the invention system.

Figures 6, 13, 14:
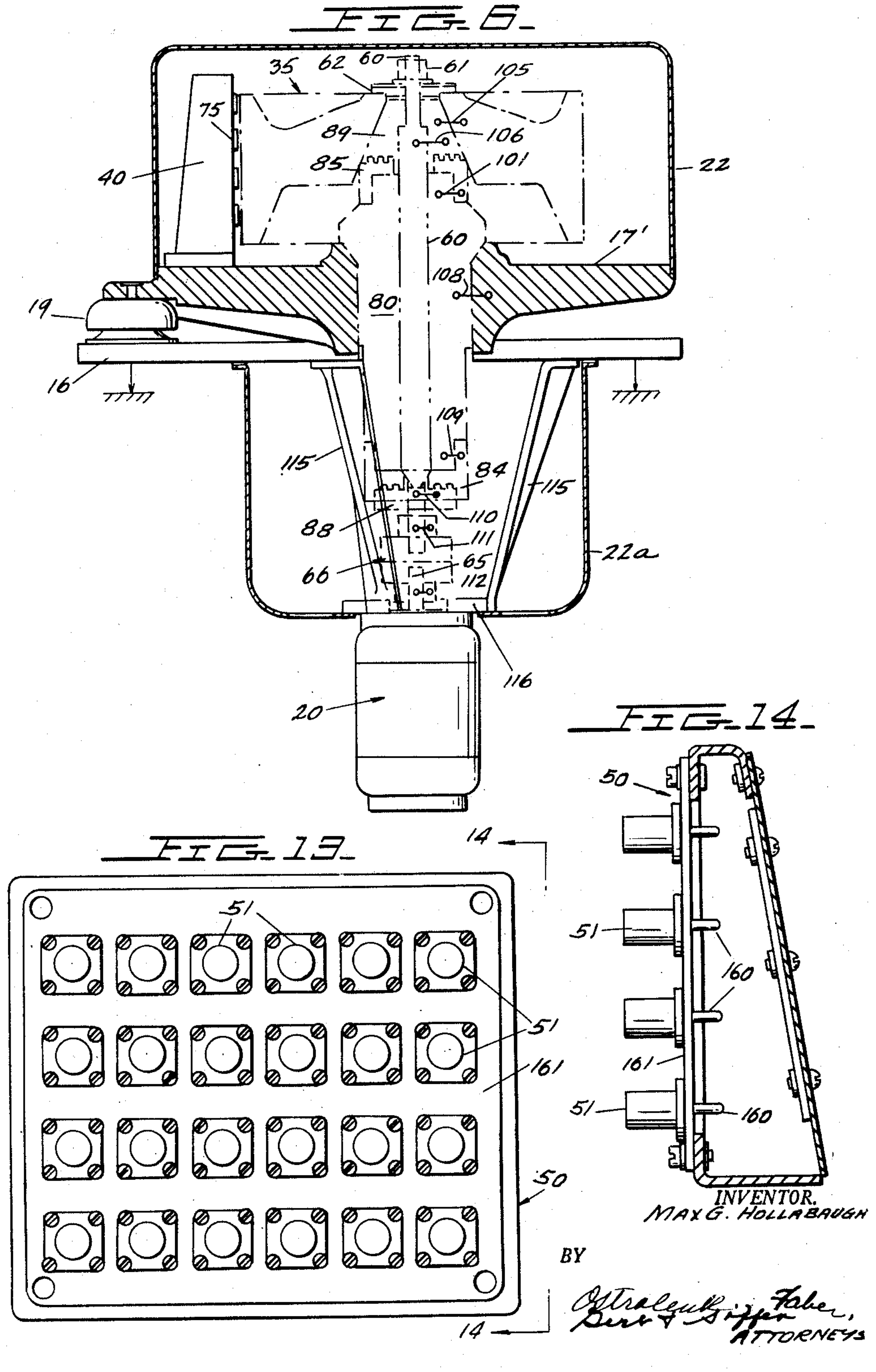
Figure 6 is a cross-sectional schematic view through a modified magnetic drum system.
Figure 13 is an elevation view of the connecting block assembly.
Figure 14 is an end view of the block assembly of Figure 13.

Figure 6 illustrates the "quill assembly" in dotted lines, showing the relationship of its components with respect to its dust-sealing feature. The shaft 60 extends from the top, above the recording drum 35, down through the quill 80 to the coupling 66. Schematic interlinkages are indicated in Figure 6, as will now be set forth, to designate the mechanical couplings involved in the quill assembly. These schematic linkages are shown for clarification of presentation herein and correspond to the physical structure shown and described in Figure 5 therefor. Linkage 105 illustrates the coupling between taper collar 89 and the internal conical tapered bore of the drum 35 through frictional contact, and abetted by the pressure of the external washer 62 pressed thereon by nut 61.

Taper collar 89 is secured to the central drive shaft 60 as indicated by linkage 106. Seal collar 85 is secured to quill 80 as link 107 illustrates. Thus, the coaction of seal collars 85 and 89 across the annular ridges serves as a bearing surface. As stated, such surfaces are highly machined and accurately fabricated to afford a precise bearing relationship. They are of hard steel material, such as a Rockwell hardness of 30C. Such materials have like temperature expansion coefficients to afford a perfect seal for all practical purposes and not freeze under wide ambient temperature ranges, either in the hot or cold regions. The quill 80 is secured in the central coacting bore of base 17', as indicated schematically by link 108. Linkage 109 shows the fastening between the bottom seal collar 84 and quill 80. Linkage 110 indicates the bottom collar seal 88 fastened to the central drive shaft 60.

As described, collars 84 and 88 are of the same material, preferably hard steel, and are accurately machined to maintain a smooth frictional bearing relationship across their mating ridge surfaces to maintain suitable operational stability over a wide ambient temperature range and keep out dust and particles from the region about the collars from entering the quill assembly, and on upwards to the magnetic assembly 35, 75. The bottom end of central shaft 60 is secured to the coupling 66 as indicated by linkage 111; and the motor output shaft 65 is connected to the same coupling 66, as indicated by linkage 112.

The materials of the collars and quill assembly are particularly selected for maximum rigidity to afford stability over long periods of time. In fact, the same care of design and construction as enters into precision gauges is preferably afforded in the structural unit 15, particularly where the moving parts or tolerances with respect to the components are significant over wide temperature, vibration and other ambient effects. For example, the bearings such as 81, 82 are operated at a very small fraction of their normal rated load for continuous long life and stability of results. With the dust covers installed, such as 22 in Figure 1 and 22′ and 22*a* in Figure 6, the system of the present invention can be operated in areas without special precaution for dust elimination. The combination of the dust covers and the quill assembly described affords clean operation under even unusual operating conditions.

All the critical parts, as well as the completed spindle and quill assembly, are preferably normalized in their processing to ensure stability over temperature ranges greatly exceeding the operating ambient, which may be considered as between 0 and 50° centigrade. Materials are carefully selected for substantially equal expansion of all parts; the proportioning of the assemblies are for similar thermal expansion rates, all for the assuring of reliable performance over wide temperature ambient ranges and conditions of vibration, shock and dust.

Figure 6 shows a modification in the shock mount assembly, particularly for the mounting of the motor assembly 20 extending from brackets 115 and its motor base 116 extending into the dust cover area indicated at 22*a*. The modification of Figure 6 uses a single set of shock mounts at 19 on top of the main base 16. The motor assembly 20 depends from the base 116. Very satisfactory operating results under wide acceleration, shock, and vibration conditions of the recording system are feasible with both the modifications of Figure 5 and Figure 6; the embodiment of Figure 5 having a double shock mounting arrangement for severe vibration conditions encountered in the surroundings.

*Magnetic assembly*

As set forth hereinabove, the magnetic drum is operated at a uniform rotational speed through the motor assembly 20. The whole magnetic recording unit is mounted on main base plate 16 through shock absorbing means such as 19 and 90, together with a flexible coupling between the motor shaft and the main magnetic drum shaft 60. Furthermore, the dust cover 22, 22*a* and the quill assembly 80 affords trouble-free operation of the drum in adverse operating conditions. The uniform rotation of the sturdy drum 35 is an important feature in maintaining uniform recording and play-back of messages on the drum surface 36. The drum surface is a thin magnetic oxide coating on the drum face 36. The face of the drum is machined to machine smoothness with careful determination of the vertical plane parallel to the axis of the drum. The coating on face 36 is made free of surface irregularities, pin holes, dead spots, etc. The coating is made with superior adherence and stability properties comparable to high-quality industrial finishes to maintain its maximum optimum operating conditions for long periods of time.

In conjunction with the features herein stated, the recording heads, per se, are designed to also withstand acceleration forces, shock, wide temperature change and vibrations with no adverse effect in their electrical characteristics. The rugged recording-playback heads 120 (read-write) are mounted in the stanchions 40. The mounting features in conjunction with stanchions 40 are arranged to allow precision initial adjustment of the recording heads with respect to the drum surface 36, combined with a high degree of mechanical permanence through adverse operating conditions. The heads are arranged for initial adjustment which permits clamping in position with rigidity such as might be expected if no adjustment provisions were to be made at all.

With the recording heads 120 having electrical characteristics for operation as a read or write unit, over a frequency band up to and above one million cycles, the magnetic digital drum of the present invention can be used for high speed operation, and in wide applications as set forth. In conjunction with suitable write and read amplifiers, the information with respect to the magnetic surface 36 on drum 35 may be read out of a cell area, and new information recorded in the same cell area on the drum surface during a single pass beneath the head. Thus, the present system herein set forth may be used wherever the advantages of a reliable drum-type magnetic storage is required, such as in digital computing systems, high speed business machines, the recording of transient phenomena, and for many other applications. The system is preferably used on a non-contacting basis between the recording heads 120 and the drum surface 36. Use of ferrite pole pieces in the magnetic units 120 with the high frequency characteristics such as up to one megacycle permit digital type pulse signals to be handled at relatively high speeds.

Figures 7, 8:
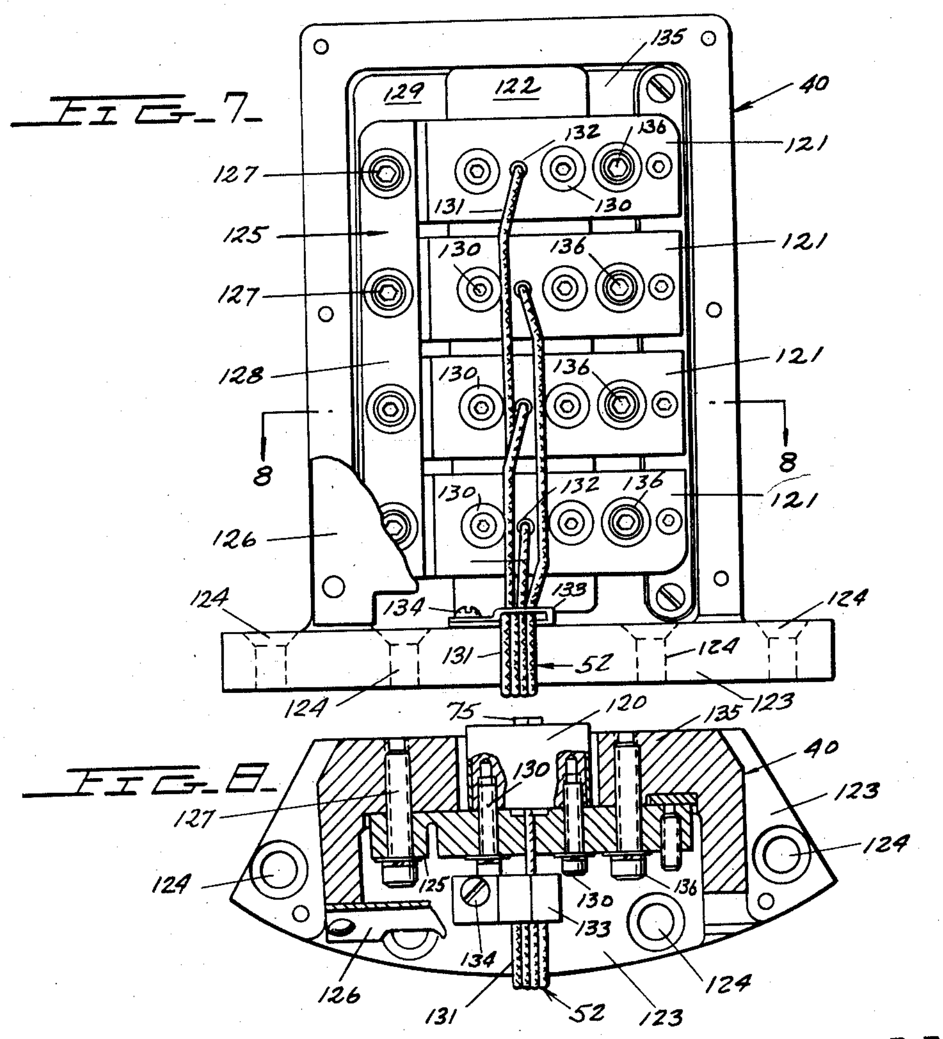
Figure 7 is a rear view, with the cover removed, of a stanchion unit assembly for the recording heads.
Figure 8 is a cross-sectional view through the stanchion of Figure 7, along the line 8—8 thereof.

The recording heads 120 are mounted on individual arms or extensions 121, 121 of a mounting block 125 within each stanchion 40. Stanchion 40 is essentially a frame having a rear opening 122 through which the recording heads 120 project for coaction of their pole faces 75 with the drum. The stanchion frame extends from the base 123 thereof having counter-sunk holes 124, 124 for screw mounting to the base of the magnetic unit. Figure 7 shows the front of the stanchion assembly with the cover 126 thereof removed. The mounting block 125 is provided with four holes through which the corresponding screws 127, 127 mount the solid post or bar 128 of block 125 against the rear member or rib 129 of stanchion 40.

A recording head 120 is secured to each of the four arms 121 extending from the vertical bar 128 of the block 125, through mounting screws 130, 130. A shielded cable 131 extends through a central hole 132 in arm 121, connecting the coils inside the recording head 120 through to the connecting block 50 (see Figures 2 and 3). Four of such shielded leads 131 from the recording units of each stanchion 40 extend down to the base 123, and through a cable clamp 133 mounted thereon by screw 134. The four shielded leads 131 constitute a cable assembly 52 from the stanchion 40 which is directed to the connector block 50 for individual connection of each of the recording heads 120 thereto. Each arm 121 of mounting block 125 is further secured to the back rib 135 of stanchion 40 through a series of individual mounting screws 136.

Figures 9, 10:
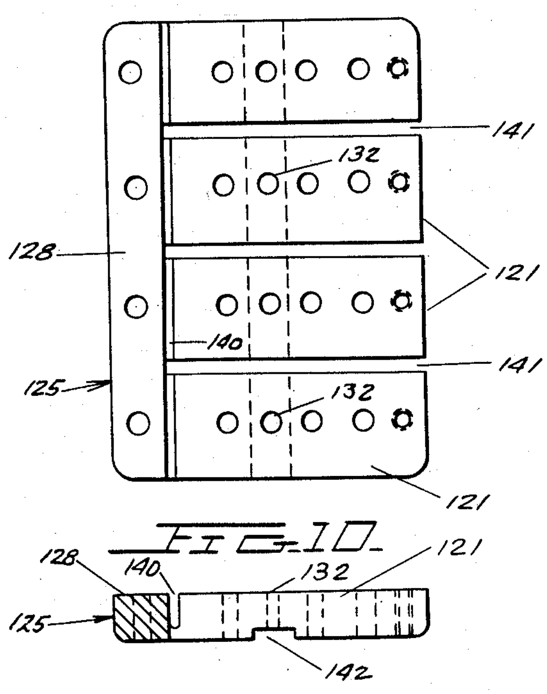
Figure 9 is a plan view of the recording head mounting block, used in the stanchions.
Figure 10 is an end view of the recording mounting block unit of Figure 9.

Figures 9 and 10 illustrate in more detail the mounting block 125 integral for mounting four recording heads 120 to the stanchion 40. The four arms 121 extending from the vertical bar 128 are originally from a single plate with bar 128. However, substantial under-cuts 140 exist between each arm and vertical member 128. Also each of the four arms 121, originally from a single plate, are separated by suitable cuts 141 therebetween. Each of the arms 121, accordingly, are readily movable in different planar relationships as required for adjustment of the separate recording heads 120 mounted on each arm 121. This arrangement provides for ready assembly of the recording head stanchion unit.

The heads 120 are individually mounted on each of the four arms 121 through their mounting screws 130. The shielded cables 131 are passed through the opening 132. At the surface of each arm 121 adjacent to the recording head 120 and its projecting cable 131, an undercut 142 is provided to prevent buckling of the wire or cable end therebetween. This provides a suitable clearance for the cable between the head and the arm 121. Each arm 121 is accordingly in a substantially cantilever spring extending from the main bar 128. It is adjustable with respect to the mounting posts 135 of stanchion 40 for suitable adjustment of each recording head 120 individually with respect to the surface 36 of the drum 35, as will now be readily understood by those skilled in the art.

Figures 11, 12:
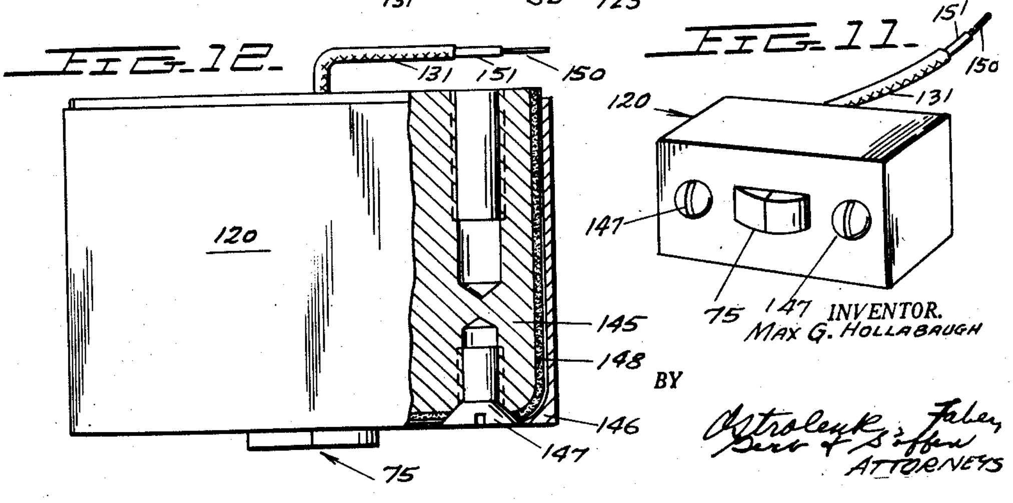
Figure 11 is a perspective view of a recording head.
Figure 12 is an elevation view of the recording head of Figure 11 partially broken away.

The recording head 120 shown more particularly in Figures 11 and 12 corresponds identically to the recording head described and detailed in the aforesaid co-pending application. The head 120 comprises the magnetic structure within (not shown) which the shielded cable 131 is passed, into the non-magnetic block 145. The outer casing 146 is secured to the unit through screws 147, 147 threaded into block 145. High permeability tape shielding 148 is passed around the recording head at block 145 and under the case 146. The ferrite pole pieces 75 project through the front of the recording head. The mounting screws 130 for the head 120 are threaded into the holes 130' of the recording head block 145. The shielded lead 131 comprises a conductor lead 150, at the central portion separated from the outer shielding of the cable by an insulation layer 151. The outer shielding and the conductor 150 connect to opposite terminals of the coils within the recording unit 120.

While it is preferred to use the magnetic recording head described and claimed in the aforesaid application, it is to be understood that the system is not limited to such heads but may utilize other read-write or recording units in their stead. An important feature of the present case is the use of a singular stanchion 40 design and a single mechanical mounting block 125 structure, yet providing for desired predetermined locations at twenty-four channel positions across the surface 36 of drum 35 for the respective twenty-four recording heads 120. Stanchion 40 is provided with sufficient vertical height whereby the block 125 must be set, depending on the stanchion position, at different heights therewithin, subtending the full number of channels required.

In an exemplary embodiment, the vertical height of the magnetic layer 36 is four inches overall. In such embodiment a desirable spacing between each of the channels for twenty-four channels would be 0.150 inch between centers thereof. Further, the spacing between the centers of each arm 121, corresponding to the central position of the pole faces 75 associated with each arm 121, is 0.900 inch. In a particular embodiment thereof, the spacings of the center line or the mounting screw line of the lowest arm 121 in each stanchion 40, with respect to the base surface 28 of the mounting base 17 (or equally, to the bottom of the base 123 of the stanchion), is as follows: 0.780"; 0.920"; 1.080"; 1.230"; 1.380" and 1.530". Similar relationships and spacings are afforded where a different width of recording surfaces, or different numbers of recording channels thereon are used. With 0.150" between centers of the channels on the magnetic surface 36, and the use of fully shielded read-write heads 120, the system provides simultaneous reading and writing in any cell area on any channel of the magnetic system, this without cross-modulation or interference between channels, or from external magnetic influences.

Figures 13 and 14 illustrate an exemplary form for the connection block 50 for twenty-four recording head leads. The cables 52 from the recording heads and stanchions are directed to the connection block 50, where a series of electrical posts 51 are mounted in a regular pattern. Each post 51 has a rearward extending lug 160 to which the corresponding conductor lead 150 of each recording head cable 131 is secured. Each terminal block 51 is separately mounted on the connecting block plate 161 of insulation material. Each terminal 51 is electrically insulated from the other and represents an individual connection to each of its associated recording heads 120, as will be evident to those skilled in the art. Connection to each terminal 51 may be made with a suitable connector at the end of a cable lead to associated electrical circuit equipment.

It is to be understood that the present invention is applicable to a wide range of uses and conditions of service beyond the exemplary descriptions and showings hereinabove, and that the principles and features of the invention may be varied without departing from the spirit and scope thereof as defined in the appended claims.

I claim:

1. A magnetic system of the character described comprising a magnetic drum rotatable about a vertical axis, a vertical drive shaft extending to and secured with said drum, structural means rotatably supporting said shaft vertically, a mounting base for the system, recording means on said base coactable with said drum, and shock-absorbing means securing said structural means with said base, a motor unit for operating said drive shaft, and second shock-absorbing means mounting said motor unit with said mounting base, whereby vibrations from said motor unit and vibrations imparted to said mounting base are prevented from affecting the cooperation of said drum and said recording means.

2. A system of the character described comprising a magnetic drum rotatable about a vertical axis with an axial opening, a vertical drive shaft extending to and secured with said drum across its said axial opening, structural means rotatably supporting said shaft vertically, a sub-base securing said structural means, recording means on said sub-base coactable with said drum, a mounting base for the system, shock-absorbing means securing said sub-base with said mounting base, a motor unit having an output shaft arranged end-to-end and substantially coaxially with the drum shaft, a flexible coupling connecting both said shaft ends, and members including second shock-absorbing means mounting said motor unit with respect to said mounting base, whereby said vibrations from said motor unit and vibrations imparted to said mounting base are prevented from affecting the cooperation of said drum and said recording means.

3. A magnetic system of the character described comprising a magnetic drum with an axial opening in a vertical plane, a vertical drive shaft extending to and secured with said drum across its said axial opening, a quill assembly rotatably supporting said shaft vertically, a sub-base securing said quill assembly, recording means on said sub-base coactable with said drum, a mounting base for the system, first shock-absorbing means securing said sub-base with said mounting base, a motor unit for operating said drive shaft, and members including second shock-absorbing means mounting said motor unit from said mounting base, whereby vibrations from said motor unit are prevented from affecting the cooperation of said drum and said recording means.

4. A magnetic system of the character described comprising a magnetic drum with an axial opening in a vertical plane, a vertical drive shaft extending to and secured with said drum across its said axial opening, a quill assembly rotatably supporting said shaft vertically, a sub-base securing said quill assembly, recording means on said sub-base coactable with said drum, a mounting base for the system, first shock-absorbing means securing said sub-base with said mounting base, a motor unit having an output shaft arranged end-to-end and substantially coaxially with the drum shaft, a flexible coupling connecting both said shaft ends, and members including second shock-absorbing means mounting said motor unit with respect to said mounting base, whereby vibrations from said motor unit and vibrations imparted to said mounting base are prevented from affecting the cooperation of said drum and said recording means.

5. A magnetic system of the character described comprising a magnetic drum having an axial opening in a vertical plane and conically tapered, recording means coactable with said drum, a vertical drive shaft for rotating said drum, a supporting member, and a quill assembly mounted in said member and rotatably supporting said shaft vertically, said quill assembly having means for sealing off the air path along said shaft and across said member to said drum and recording means, said quill assembly including a tapered collar joining said shaft and said drum across the tapered opening thereof, and a second collar secured with respect to said member having coaxial ridges coacting with mating ridges in the tapered collar.

6. A system of the character described comprising a magnetic drum rotatable about a vertical axis having an axial opening, recording means coactable with said drum, a drive vertical shaft secured to said drum in the axial opening thereof, and a quill assembly rotatably supporting said shaft vertically having means for sealing off the air path along said shaft to said drum and recording means, said quill assembly including a first collar joining said shaft and said drum across the opening thereof, a second collar having coaxial ridges coacting with mating ridges in said first collar, and third and fourth collars at the opposite end of said quill assembly having coacting mating ridges, a quill body between the coacting pairs of collars, and roller bearings within said quill body rotatably carrying said shaft.

References Cited in the file of this patent

UNITED STATES PATENTS

| | | |
|---|---|---|
| 2,668,879 | D'Arcy | Feb. 9, 1954 |
| 2,694,192 | Dean | Nov. 9, 1954 |
| 2,700,588 | Williams | Jan. 25, 1955 |
| 2,710,191 | Williams | June 7, 1955 |
| 2,714,010 | Gruber | July 26, 1955 |
| 2,756,279 | Lang | July 24, 1956 |
| 2,810,622 | Brown | Oct. 22, 1957 |